United States Patent [19]
von der Heide

[11] 4,428,537
[45] Jan. 31, 1984

[54] APPARATUS FOR THE REMOVAL, LOADING, CONVEYING, PREPARATION AND DISTRIBUTION OF ANIMAL FOOD

[76] Inventor: Hans von der Heide, Ibbenbürener Str. 17, 4533 Laggenbeck, Fed. Rep. of Germany

[21] Appl. No.: 298,278

[22] Filed: Sep. 1, 1981

[30] Foreign Application Priority Data

Sep. 9, 1980 [DE] Fed. Rep. of Germany ....... 3033824

[51] Int. Cl.³ .............................................. B02C 21/02
[52] U.S. Cl. .............................. 241/101 B; 241/101.7; 241/152 A; 241/283
[58] Field of Search ........... 241/101 A, 101 B, 101 D, 241/101.5, 101.6, 101.7, 283, 152 A

[56] References Cited

U.S. PATENT DOCUMENTS

| 3,700,179 | 10/1972 | Peursem | 241/101.7 UX |
| 3,897,018 | 7/1975 | Wilkes et al. | 241/101 A X |
| 3,926,378 | 12/1975 | Ryan | 241/101 A X |
| 3,985,305 | 10/1976 | Williamson et al. | 241/283 X |
| 4,157,164 | 6/1979 | Helm et al. | 241/283 X |
| 4,287,708 | 9/1981 | Neely, Jr. | 241/101.7 X |
| 4,330,091 | 5/1982 | Rozeboom et al. | 241/101 B X |

FOREIGN PATENT DOCUMENTS

| 1481446 | 4/1969 | Fed. Rep. of Germany . |
| 2535701 | 10/1973 | Fed. Rep. of Germany . |
| 7713100 | 5/1979 | Netherlands | 241/283 |

Primary Examiner—Mark Rosenbaum
Attorney, Agent, or Firm—Fitch, Even, Tabin & Flannery

[57] ABSTRACT

A self-propelled apparatus is provided for being positioned adjacent stack of silage with a comminuting and removing apparatus at the rear of the chassis being vertically positioned to cut and to remove and to comminute the silage from the stack. A loading means receives the comminuted silage and delivers the same onto the vehicle chassis where the silage is milled and disintegrated. A food product compartment on the chassis holds a food product which is combined with the silage to form a composite animal food. Means convey and discharge the food product from the food compartment for combining with the silage. A reversible conveying and discharging means discharges the composite animal food either to the left or to the right from beneath the chassis.

8 Claims, 2 Drawing Figures

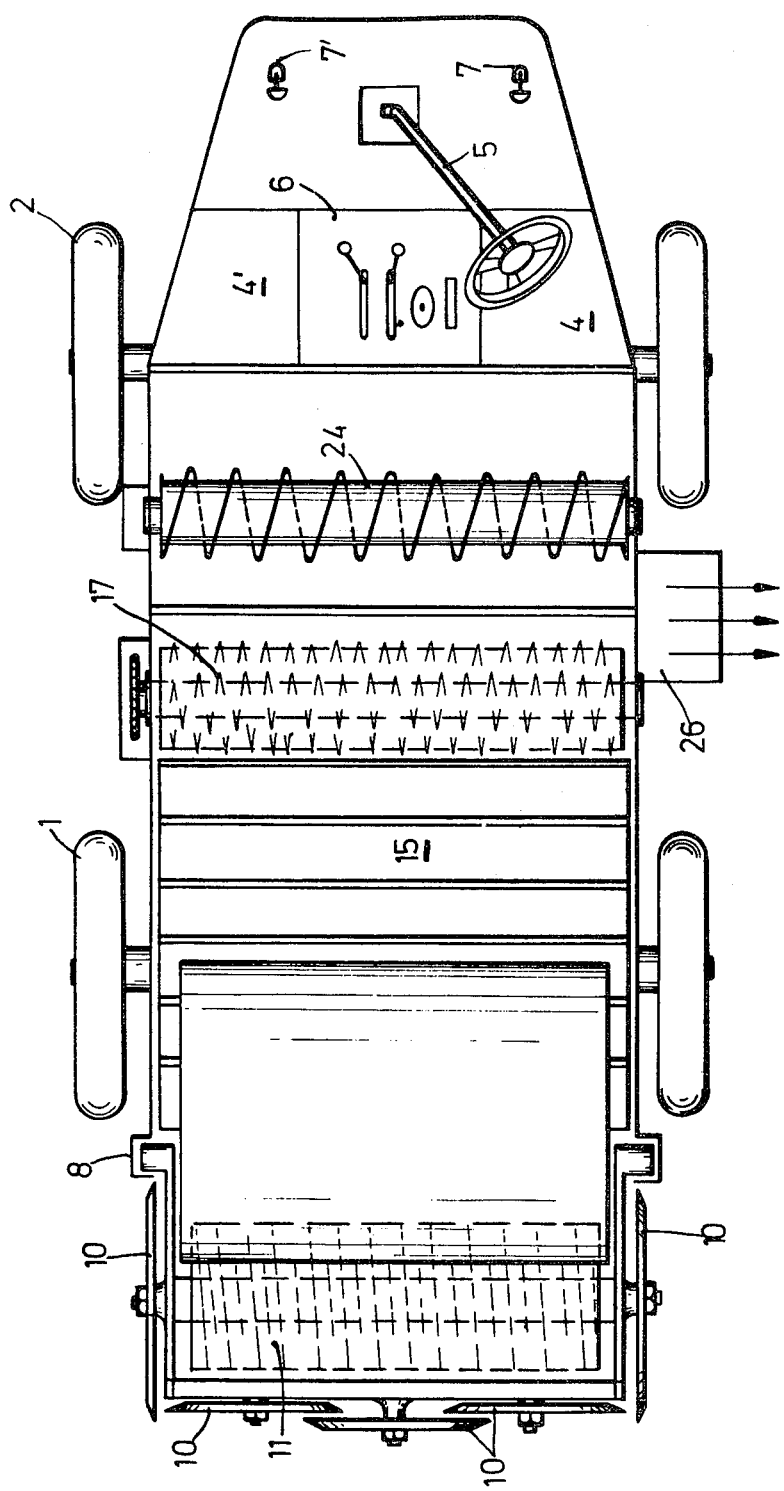

APPARATUS FOR THE REMOVAL, LOADING, CONVEYING, PREPARATION AND DISTRIBUTION OF ANIMAL FOOD

The invention relates to an apparatus for the removal, loading, conveying, preparation, and distribution of animal food.

An apparatus is known from prior art wherein a milling roller and the subsequent receiving tank form a unit in such a fashion that the milling roller is located at the end of the receiving tank and performs its upward and downward movement together with said tank, if and when the unit is mounted at the three point linkage of a tractor (German Publication Copy No. 14 81 446).

In this respect it is disadvantageous that the receiving tank only has a closely limited receiving capacity for the silage material to be loaded, thereby necessitating frequent trips, so that the tractor cannot be assigned for other important operations.

In another known apparatus for the removal, conveying and distribution of silage food it was therefore suggested that the milling roller is arranged rotatably about a horizontal shaft, propelled from one side and equipped with cutting knives about its circumference, said milling roller being movable in addition to its rotary movement also as a whole upward and downward in vertical direction, and also arranged at two arms gripping the receiving tank from the exterior, where said roller can carry out its upward and downward movement independently of the receiving tank, while the latter remains in reposing position (German Display Copy No. 25 35 701).

This apparatus, too, to the detriment of the remaining yard operations has to depend on the use of the tractor. In addition to the limits and difficulties of the prior art apparatus caused thereby, the necessity results in many cases for the best possible preparation of the silage food, for example by comminution and/or disintegration as well as for the preparation of a high quality food mix with prorated use of silage and other foods.

The invention is based on the problem of obviating the limits and problems present under the state of the art and on the further development and improvement of the equipment known from prior art with the objective of achieving on the one hand an independence from the tractor, of facilitating the removal of the silage from the portable or stationary silo, to increase the loading capacity for the silage material and specifically of creating to this extent a universally applicable new apparatus, whereby it also should be capable of preparing the obtained silage food as well as possible and to prepare it, if applicable along with a food supplement to a highly qualified food mix.

The problem is solved in that the new apparatus offers the following characteristics:

a. a self-propelled installation with chassis, loading platform, drivers set with operating, steering and braking systems, as well as propulsion means for the driving and/or for the mechanical installations;

b. a vertically adjustable apparatus arranged at the rear side for the removal, comminution and centrifugal conveying of the silage material from the portable or stationary silo with a loading platform articulated thereon and co-pivotable commensulrate with the vertical adjustment;

c. a subsequent loading area compartment for the silage material equipped with a scraper conveyor on the botton side, the terminal portion of said loading compartment being formed in conveying direction and forwardly by a plurality of milling, dosifying, disintegrating and discharge rollers arranged in an approximately vertical plane;

d. an installation for the preparation of the animal food comprising a loading compartment arranged in the front area of the loading platform for a food product intended for being mixed with the silage material, with inclined bottom parts sloping toward a discharge slot and a preferably rotating discharge or metering element arranged in the area of the slot in the form of a worm gear or a roller;

e. an installation for the mixing and distribution of the prepared food comprising a discharge aperture arranged below the loading platform and between the compartments for silage food and food product and extending over the width of the platform and comprising a mixing and distribution means in the form of a conveyor and/or discharge belt preferably reversible in the conveying direction.

The invention makes possible a self-propelled apparatus with special capacity for the removal and loading as well as the preparation of silage food as a main ingredient of the ready-mixed food, which is universally appropriate to obtain a ready-mixed food, as well as functional means needed for the storage and admixing of the food stuff and the proper metering of the food ingredients, in a compact, self-contained and yet very clear and easy to operate assembly. With the aid of coacting operations of scraper conveyors and milling, metering, disintegrating and discharge rollers the silage material is disintegrated, comminuted and in that manner ideally prepared for the preparation of the food mix prior to the blending Additional improvements of the invention are recited in claims 2 to 5. Thereby the arrangement of the rotating knives at the apparatus designed as cutting head for the separating, comminuting and centrifugal conveying offers the advantage of working down the silo in straight sections, thereby minimizing the otherwise inevitable loss of food. The very long guide means thereby assures a removability even with relatively high portable and stationary silos. Due to the fact that contrary to the tractor operation in the self-propelled vehicle according to the invention with the pivotable steering column a selective right or lefthand steering is possible, the new apparatus, particularly also on account of the reversibility of the conveying direction of the distribution apparatus, can operate with any stable facility. This substantially improves its applicability. Moreover, the apparatus according to the invention, thus is capable of fully and completely solving the problems, solution of which is expected of it.

Additional characteristics and advantages result from the following specification, wherein one embodiment of the new apparatus is explained in greater details by way of the drawing.

FIG. 2 is a top view upon the same apparatus.

Figure 1:
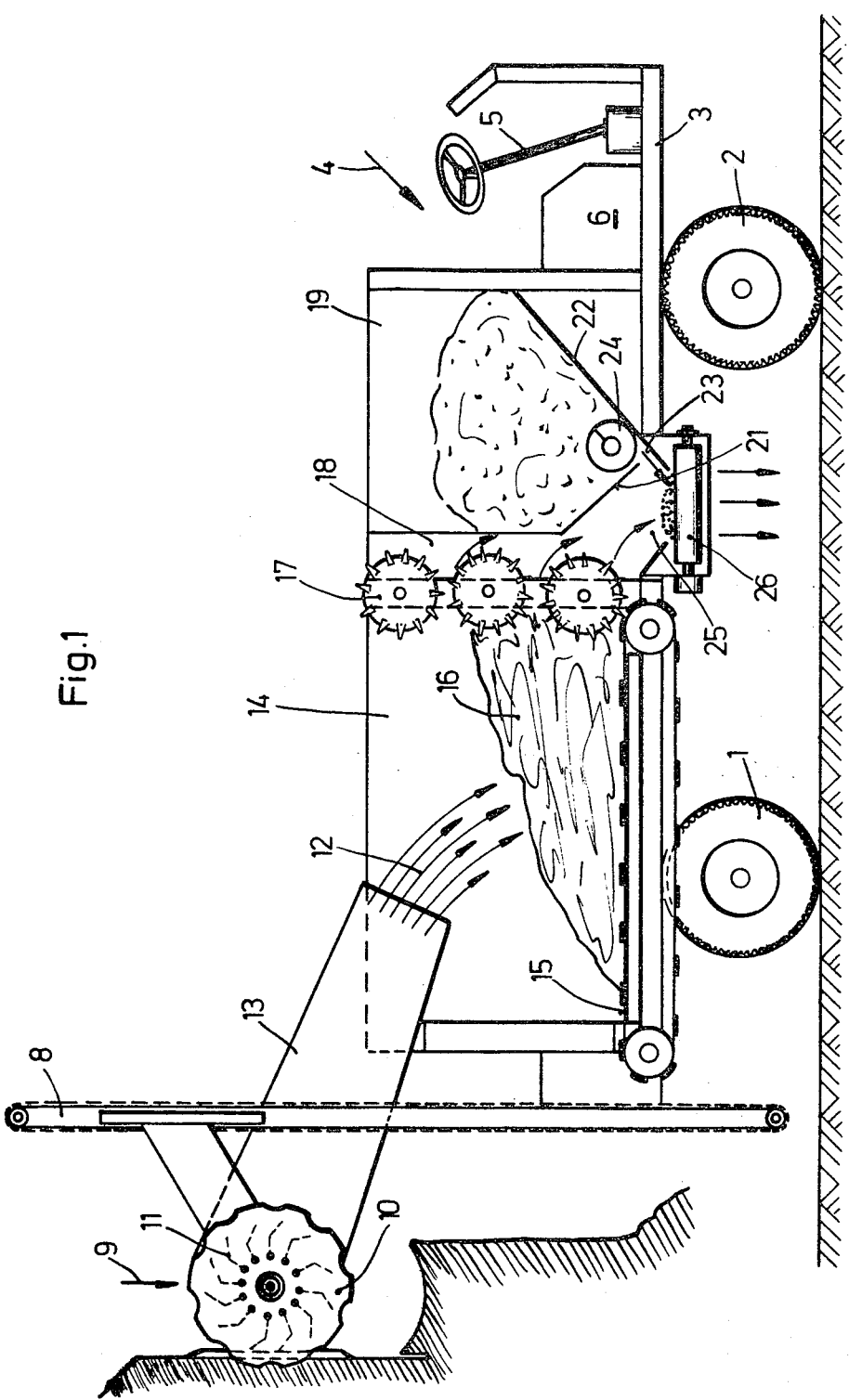
FIG. 1 shows a lateral view of the invention with the sidewall removed.

As can be seen from the exemplified embodiment of the new apparatus according to FIG. 1, the basic design relates to a selfpropelled carriage whose chassis contains the rear wheels 1 and the steerable front wheels 2, along with a continuous platform 3. The drivers seat 4 is located in the front along with the steering column 5, with the propellants which consist for example of a combination diesel engine/hydraulic system installed beneath the engine hood 6. As can be seen from the top view in FIG. 2, the apparatus according to the invention is equipped with one drivers seat each 4, 4' on the right and left side for selective right hand- left hand steering, with the steering column 5 being pivotable accordingly. Accordingly the brake pedals 7, 7' are arranged on the right or left side.

The vertical guide means 8 for raising or lowering of the apparatus comprising a cutting head 9 for the removal, comminution and centrifugal conveying is mounted in the posterior area of the apparatus. It is equipped with a number of rotating knives 10 which is propelled, like the additional functional elements described below, by hydraulic individual drives. A drumstick roller 11 is arranged in the area surrounded by the knife head 9, said roller having a multiplicity of articulatedly mounted drumsticks secured to the roller rotating with a horizontal shaft; said drumsticks crumb up the initial cut of the silage and convey the crumby silage material 12 with the aid of the conveying chute 13 articulated pivotably at the cutting head 9 into the first loading area compartment 14. A scraper conveyor 15 mounted to the bottom of said compartment conveys the loaded silage material 16 forwardly against the milling, metering, disintegrating and discharge rollers 17 arranged in an approximately vertical plane as the seal of the loading compartment 14. According to their designations, these rollers have the multiple task to comminute, disintegrate, meter and discharge the silage material into the discharge area 18 in one operation or pass.

Another compartment 19 is located between the discharge area 18 and the drivers seat 4 for a food stuff which is admixed to the silage food 16 prepared for the mixture for the preparation of the ready-mixed food. For that purpose the loading compartment 19 is equipped with sloping bottom parts 21, 22 like a silo for bulk material, with a discharge slot 23 between them, in whose area a discharge and metering worm gear 24 is arranged. The material arriving in the discharge area 18 from the two loading compartments 14 and 19 drops through a bottom slot 25 upon a mixing and distribution means having the form of a conveyor or throw-off belt 26.

The propulsion for driving is accomplished by individual hydraulic drives preferably at both axles of the rear wheels 1 and the front wheels 2. The drives for the remaining functional units like scraper conveyor 15, rotary knives 10, hoisting apparatus 8 for the knife head 9; milling rollers 17, discharge worm 24, conveyor belt 26, etc. are likewise equipped with individual hydraulic motors which are fed from the joint hydraulic network of the apparatus.

I claim:

1. A self-propelled apparatus for preparation and distribution of a composite animal food comprising:
    a vehicle chassis having a frame,
    self-propulsion means mounted on the vehicle chassis for propelling and driving the chassis,
    steering means on the vehicle chassis for steering the same as it is being driven by the propulsion means,
    a comminuting and removing means at the rear end of the chassis for removal and comminution of silage from a stack adjacent the rear end of the chassis,
    a loading means receiving the comminuted and removed silage from the comminuting and removing means and for loading the same onto the vehicle chassis,
    means for mounting the removing and comminuting means for vertical movement to different vertical positions relative to the silage stack,
    a food product compartment on the chassis for holding a food product to be combined with the silage to form a composite animal food,
    means on the vehicle chassis for milling and metering and disintegrating the silage,
    means for conveying and discharging the food product from the food product compartment for combining with the silage to form the composite animal food,
    and conveying and discharging means receiving the composite animal food and for conveying and discharging the same from the vehicle chassis.

2. An apparatus in accordance with claim 1 in which the means for loading the silage onto the vehicle chassis comprises:
    a loading platform which is pivotally mounted and is vertically moveable with the comminuting and removing means.

3. An apparatus in accordance with claim 1 in which said conveying and discharging means includes a conveyor belt located beneath the chassis,
    and reversible drive means for driving the conveying amd discharging belt in opposite directions.

4. An apparatus in accordance with claim 3 in which the steering means comprises:
    left and right side driver seats and a centrally located steering column allowing the apparatus to be steered either from the right or left side of the vehicle.

5. An apparatus in accordance with claim 1 in which the propulsion means comprises:
    an internal combustion engine and a hydraulic apparatus driving the engine,
    the hydraulic apparatus driving the comminuting and removing means and the conveying and discharging means.

6. An apparatus in accordance with claim 1 in which the removing and comminuting means comprises knives for cutting the silage and for rotating about generally vertical axis, and
    a drumstick roller for picking up and centrifically conveying the silage cut by the knives.

7. An apparatus in accordance with claim 6 in the means for mounting the removing and comminuting means comprises:
    a rectangular frame means for mounting the removing and comminuting means, and hoisting means for raising and lowering the comminuting and removing means on the frame means and relative to the chassis.

8. An apparatus in accordance with claim 1 including a scrapper conveyor on the chassis having an endless belt for receiving the silage and for conveying the same from the rear of the chassis forwardly to the means for milling and metering and disintegrating the silage.

* * * * *